United States Patent
Neumeir et al.

(10) Patent No.: US 10,890,262 B2
(45) Date of Patent: Jan. 12, 2021

(54) CLOSURE DEVICE

(71) Applicant: VAT Holding AG, Haag (CH)

(72) Inventors: Anton Neumeir, Mering (DE);
Christoph Angst, Eichberg (CH);
Karlheinz Summer, Bludenz (AT);
Bernhard Duelli, Ubersaxen (AT)

(73) Assignee: VAT Holding AG, Haag (CH)

( * ) Notice: Subject to any disclaimer, the term of this patent is extended or adjusted under 35 U.S.C. 154(b) by 171 days.

(21) Appl. No.: 16/092,088

(22) PCT Filed: Mar. 31, 2017

(86) PCT No.: PCT/EP2017/057642
§ 371 (c)(1),
(2) Date: Dec. 6, 2018

(87) PCT Pub. No.: WO2017/174448
PCT Pub. Date: Oct. 12, 2017

(65) Prior Publication Data
US 2019/0293187 A1    Sep. 26, 2019

(30) Foreign Application Priority Data

Apr. 8, 2016 (AT) .................................. A 185/2016

(51) Int. Cl.
*F16K 3/02* (2006.01)
*F16K 3/18* (2006.01)
(Continued)

(52) U.S. Cl.
CPC ............ *F16K 3/0281* (2013.01); *F16K 3/188* (2013.01); *F16K 3/207* (2013.01); *F16K 51/02* (2013.01)

(58) Field of Classification Search
CPC .......... F16K 51/02; F16K 3/0281; F16K 3/18; F16K 3/182; F16K 3/188; F16K 3/20;
(Continued)

(56) References Cited

U.S. PATENT DOCUMENTS 1,476,344 A * 12/1923 McGee .................... F16K 3/207
138/94.3
1,868,147 A *  7/1932 Kruse ...................... F16K 3/207
251/172
(Continued)

FOREIGN PATENT DOCUMENTS

CN      2709730      7/2005
DE      4028182      3/1992
(Continued)

*Primary Examiner* — David Colon-Morales
(74) *Attorney, Agent, or Firm* — Volpe Koenig (57) ABSTRACT

A closure device including a closure element for closing an opening surrounded by a valve seat of the closure device. The closure device has an open state, in which the closure element exposes the opening at least partly, for an object to be led through the opening, an intermediate state, in which the closure element is brought into alignment with the opening without contact with the valve seat, and a closed state, in which the closure element at least rests on the valve seat via a seal of the closure device. The seal has a hollow space, to which a pressure medium from a pressure source of the closure device can be applied, and the closure device has a suction apparatus for sucking the pressure medium out of the hollow space of the seal.

15 Claims, 9 Drawing Sheets

(51) Int. Cl.
*F16K 3/20* (2006.01)
*F16K 51/02* (2006.01)

(58) Field of Classification Search
CPC .......... F16K 3/207; F16K 3/314; F16K 3/316; F16K 3/3165; F16K 27/044
See application file for complete search history.

(56) References Cited

U.S. PATENT DOCUMENTS

| | | | | |
|---|---|---|---|---|
| 2,265,175 | A * | 12/1941 | Kinzie | F16K 27/044 137/315.3 |
| 3,145,969 | A * | 8/1964 | Von Zweck | F16K 51/02 251/172 |
| 3,178,779 | A * | 4/1965 | Clark | B64C 1/14 277/646 |
| 3,371,493 | A * | 3/1968 | Woolley | E02B 13/00 405/106 |
| 3,576,198 | A * | 4/1971 | Bessot | F16K 3/188 137/375 |
| 4,109,922 | A * | 8/1978 | Martin | B23K 15/06 277/646 |
| 4,227,702 | A * | 10/1980 | Thate | F16J 15/46 277/646 |
| 4,278,236 | A * | 7/1981 | Janich | F16K 3/207 251/159 |
| 4,415,139 | A * | 11/1983 | Potts | F16K 3/0254 251/159 |
| 4,562,992 | A * | 1/1986 | Sugisaki | F16K 3/207 251/159 |
| 4,747,577 | A | 5/1988 | Dimock | |
| 4,938,528 | A * | 7/1990 | Scott | A47C 7/467 297/284.6 |
| 5,295,661 | A * | 3/1994 | Roussel | F16K 3/0218 251/204 |
| 5,566,922 | A * | 10/1996 | Tanaka | F16K 3/188 251/157 |
| 5,618,024 | A * | 4/1997 | Westenberg | F16K 3/207 251/159 |
| 5,626,324 | A | 5/1997 | Nakamura et al. | |
| 5,772,950 | A | 6/1998 | Brustad et al. | |
| 7,114,702 | B2 * | 10/2006 | Sauer | F16K 3/207 251/195 |
| 7,980,529 | B2 * | 7/2011 | Seitz | F16K 51/02 251/175 |
| 8,641,014 | B2 * | 2/2014 | White | F16K 51/02 251/175 |
| 9,383,037 | B2 * | 7/2016 | Duelli | F16J 15/46 |
| 2005/0199849 | A1 | 9/2005 | Sauer | |
| 2012/0061605 | A1 | 3/2012 | White | |
| 2018/0216739 | A1 * | 8/2018 | Ehrne | F16K 3/029 |

FOREIGN PATENT DOCUMENTS

| | | | |
|---|---|---|---|
| DE | 4028182 A1 * | 3/1992 | ............ F16K 3/207 |
| EP | 1577592 | 9/2005 | |
| FR | 2283375 | 3/1976 | |
| FR | 2283375 A1 * | 3/1976 | ............ F16K 51/02 |
| GB | 1530977 | 11/1978 | |
| JP | 5215249 | 8/1993 | |
| JP | 2005240883 | 9/2005 | |
| JP | 2006046489 | 2/2006 | |
| WO | 2011091451 | 8/2011 | |

\* cited by examiner

CLOSURE DEVICE

BACKGROUND

The present invention relates to a closure device comprising a closure element for closing an opening of the closure device that is surrounded by a valve seat of the closure device, wherein the closure device has an open state of the closure element, in which the closure element exposes the opening at least partly, in particular completely, for an object to be passed through the opening, and an intermediate state of the closure element, in which the closure element is brought into alignment with the opening without contact with the valve seat, and a closed state of the closure element, in which the closure element at least rests on the valve seat via a seal of the closure device, wherein the seal has a hollow space to which a pressure medium from a pressure source of the closure device can be applied.

Closure devices of this kind are known per se in the prior art. For this purpose, reference is made for example to WO 2011/091451 A1. According to that document, with a switching valve in a corresponding position the pressure medium is discharged from the hollow space of the seal against atmospheric pressure, as is illustrated in particular in FIG. 11 of the present document.

The service life of the seal in closure devices of the type described is often a decisive factor in determining how often the closure device must be serviced. The service life of the seal is thus an important consideration in the question of how high the servicing costs are for such closure devices when the devices are in constant operation.

SUMMARY

It is the object of the invention to improve closure devices of the abovementioned type in such a way that the seals have a longer service life and consequently the closure devices are associated with less servicing expense.

In order to meet this objective, the invention suggests that the closure device has a suction apparatus for sucking the pressure medium out of the hollow space in the seal.

In contrast to the prior art, it is therefore provided according to the invention to actively suck the pressure medium out of the hollow space in the seal by a suction apparatus. This not only enables the seal to be emptied more quickly, but also and most importantly it can be brought into an intended contracted state which prevents the seal from becoming damaged or worn during movement of the closure element. In contrast to the prior art, in which as a rule the pressure medium is passively discharged from the hollow space in the seal simply against ambient pressure, according to the invention an active suction of the pressure medium out of the hollow space in the seal is provided by the suction apparatus provided according to the invention. The suction apparatus is thus preferably a technical apparatus with which it is possible to suck the pressure medium out of the hollow space in a controlled manner. For this purpose, both the pressure source and the suction apparatus may be embodied as pumps. At the same time, it may be provided that the pressure source and the suction apparatus are components which are separate from each other and can be connected to the hollow space in the seal in an alternating manner via a switching valve. However, the pressure source and the suction apparatus may also be embodied as a combined apparatus, which not only enables the application of pressure but also the suction of the pressure medium out of the hollow space. In this context in particular, the possibility exists to design the pressure source and the suction apparatus as a combined pump. It may thus be provided in embodiments of the invention that the pressure source and/or the suction apparatus is/are embodied as a single, preferably combined, pump. However, pressure lines or the like may also be used as the pressure source. When sucking the pressure medium out of the hollow space, the suction apparatus advantageously generates a negative pressure which is lower than the atmospheric pressure. The pressure medium which is applied to the hollow space in the seal may be either liquid or gaseous. Accordingly, the pressure source and suction apparatuses may be realized as both pneumatic and hydraulic systems.

When the pressure medium is applied to the hollow space in the seal, the seal is preferably expanded. That is to say when pressure medium is applied to the hollow space, the seal advantageously increases its volume and/or its outer dimensions. When the pressure medium is sucked out of the hollow space in the seal via the suction apparatus, in preferred embodiments of the invention the seal contracts so that its volume and outer dimensions are reduced.

In preferred embodiments, the seal is designed to surround the respective opening, preferably in a circumferentially closed manner. It may thus form a kind of encircling tube, for example. The seal may be integrated in the closure element, or also in the valve seat and affixed to the respective component. The closure device advantageously includes a housing, wherein it is then advantageously provided that the valve seats are part of the housing or are affixed thereto, while the closure element is movable relative to the housing. Additionally, one seal or multiple seals of the kind described may each be present and preferably affixed to both the valve seat and the closure element.

Closure devices according to the invention could also be described as valves. In this case, they are expediently valves of the kind described as "transfer valves", through whose opening objects can be transported if the openings are not closed by the closure element. To this extent, the openings might also be referred to as transfer openings. In preferred embodiments, the closure element advantageously has the form of a disk or valve disk.

Closure devices or valves according to the invention may also be used particularly in negative pressure technology. Accordingly, they might also be described as negative pressure valves. In this context, the negative pressure range describes operating states in which pressures below atmospheric pressure are reached. Preferably, the operating states in question are associated with pressures (absolute values) from 100 mbar (millibar) to 1 mbar.

Closure devices according to the invention are characterized in that the closure element can assume at least three states, specifically the open state, the intermediate state, and the closed state. In the open state, the closure element partly or completely exposes the opening, so that an object or a fluid can be passed through the opening. In the intermediate state, on the other hand, the closure element is already in alignment with the opening, with the result that in this state, as a rule at least, no objects can be passed through the opening any more. However, in the intermediate state the closure element is not yet in contact with the valve seat. This means it has been brought into alignment with the opening in such a way that it is not in contact with or has no physical contact with the valve seat. In the closed state, the seal or at least one of the seals of the closure device bears on both the valve seat and the closure element. In this context, as already noted previously, the seal may be permanently affixed to both the valve seat and the closure element. In preferred embodiments of the invention, not only does the closure element rest on the valve seat via the seal in the closed state, but it is also connected thereto in a sealing manner via the seal and is pressed against the valve seat with the interposition of the seal.

With regard to the preceding description, it should be noted that the closure element is typically transported or moved between the open state and the intermediate state. Such a movement may involve either pivoting or displacement or a combination of these motion types. On the other hand, the closure element does not necessarily have to be moved when transitioning between the intermediate state and the closed state. It may also be provided that starting from the intermediate state only the seal is expanded when the hollow space thereof is charged with pressure medium, so that in the closed state the closure element then at least rests on the valve seat via the seal or one of the seals. However, this does not preclude the closure element from being moved as well or on its own between the intermediate state and the closed state. It may also be provided, for example, that the closure element is actively pressed against the valve seat with the interposition of the seal, and only then is the seal expanded by application of pressure medium to the hollow space to such an extent that it forms a seal between the closure element and the valve seat. Mixed forms of both operations are also conceivable. In this context, it is also further noted that the closure element may assume different positions in the closed state, in particular relative to a housing of the closure device. It is thus conceivable for example that the closed state is already reached through the application of pressure by way of pressure medium to the hollow space of the seal, and then under the effect of a differential pressure acting on the closure element the closure element in the closed state is also pressed against the valve seat, causing further compression of the seal, for example, which may result in a movement of the closure element.

A method for operating a closure device according to the invention may provide for example that starting from the open state the closure element is brought, that is to say particularly slid and/or pivoted, into the intermediate state. Then, at least one seal may be charged with the pressure medium from the pressure source so that the expansion thereof and/or a corresponding movement of the closure element causes a transition from the intermediate state to the closed state. Then, the closure element in the closed state may be pressed against the valve seat by a differential pressure acting on the closure element. The opening then takes place in reverse order. For this, as a rule a possibly present differential pressure must first be neutralized. Then, the pressure medium is sucked out of the hollow space in the seal by the suction apparatus, and the closure element is thus brought from the closed state into the intermediate state. Then, the closure element may subsequently be slid and/or pivoted to bring it into the open state, in which it completely or partly exposes the opening.

In particularly preferred embodiments of the invention, it is provided that the closure device comprises two openings, each of which is surrounded by a valve seat, and in the intermediate state the closure element is arranged such that it is not in contact with the valve seats between the openings and in the closed state a seal is arranged in each case between each of the valve seats and the closure element and the closure element at least rests on at least one of the valve seats via at least one of the seals, wherein each of the seals has a hollow space, to each of which a pressure medium can be applied from the pressure source of the closure device and can be sucked out by the suction apparatus. In this context, both openings, each of which is surrounded by a valve seat, are advantageously designed to be in alignment with each other. These may also be openings in a housing of the closure device. The valve seats may in turn be part of the housing or affixed thereto. In this context, it should further be noted that in the closed state of such embodiments of a closure device according to the invention it is generally sufficient if the closure element at least rests on at least one of the valve seats via only one of the seals. However, it may also be provided that the closure element in the closed state rests on each valve seat by each respective seal. In order to enable it to be moved towards at least one of the valve seats, particularly in the closed state or from the intermediate state into the closed state, preferred variants of the invention provide that the closure element is arranged, preferably suspended, in the manner of a pendulum. The closure element may be arranged, preferably suspended, on a guide such that it is adjustable in a parallel direction in the closed state or from the intermediate state into the closed state. Along this guide, the closure element may be movable, preferably displaceable and/or pivotable between the open state and the intermediate state. For this purpose, the guide may include a rail guide or the like. For example, it may be provided that the closure element is arranged, preferably suspended, from the or a guide by at least two hinged joints on the closure device and at least one pivot lever arranged between the hinged joints on the closure device. Alternatively, the closure element may also be arranged, preferably suspended, from the or a guide by at least one bending spring of the closure device which may be extended transversely to the longitudinal extension thereof. Mixed forms of these two embodiments are also conceivable, for example by using a bending spring which may be deflected correspondingly transversely to its longitudinal extension to serve as the pivot lever. In the case of hinged joints, the axes of the hinged joints, about which the hinged joints are pivotable, are advantageously arranged parallel to each other.

A further aspect of the invention relates to a closure device with a closure element for closing two openings of the closure device, each of which is surrounded by a valve seat of the closure device, wherein the closure device has an open state of the closure element, in which the closure element exposes the openings at least partly, in particular completely, for an object to be passed through the openings, and an intermediate state of the closure element, in which the closure element is arranged between the openings without contact with the valve seats, and a closed state of the closure element, in which the closure element at least rests on at least one of the valve seats via a seal. Given such a closure device, in order to meet the objective stated above it is provided that the closure device has at least one, preferably elastic, positioning element for the purpose of aligning the closure element in a predefined or pre-definable intermediate position between the valve seats. Such positioning elements make it possible to ensure that, particularly when in the intermediate state, the closure element is arranged in a predefined or pre-definable intermediate position between the valve seats in such a manner by the one or more positioning elements that it is not possible for the seal to collide with the valve seat or other components of the closure device when the closure element is subsequently moved from the intermediate state into the open state. In other words, the at least one positioning element of this aspect of the invention thus ensures that the closure element is brought into a predefined or pre-definable intermediate position to prevent collisions between the seal and other components of the closure device. In this context, an intermediate position is understood to be a position or location of the closure element between the valve seats, whereas in contrast thereto the intermediate state allows the closure element to take up various positions provided the aforementioned criteria of the intermediate state are satisfied. The intermediate position, or the position the closure element takes up in the intermediate position between the valve seats, may be predefined unchangeably by the positioning element. However, it can also be provided that the positioning element itself is designed to be displaceable and/or adjustable, so that a corresponding intermediate position of the closure element can be predefined, i.e. is pre-definable by corresponding adjustment and/or displacement of the positioning element. The positioning element may include for example a pin which is mounted so as to be displaceable, spring-loaded or biased by an elastomeric body. The biasing may also be generated by a hydraulic or pneumatic spring. However, the positioning element may also be driven by a motor or pneumatically or hydraulically. However, it is preferably an elastic positioning element, which can perform its function without a separate drive, such as is the case with a spring, an elastomeric element or some other elastic body for example. The positioning element may be braced on or affixed to a housing of the closure device, for example, and may act on the closure element via a corresponding pin. It is also conceivable to affix and/or brace the positioning element on the valve seat. Conversely, however, the positioning element may also be affixed and/or braced on the closure element and act on the valve seat via a corresponding pin. An interactive arrangement between the positioning element and said guide is also conceivable in principle.

Particularly preferred embodiments of this aspect of the invention provide that the closure device has at least one elastic positioning element in each case on each of two opposite sides of the closure element in order to align the closure element in the predefined or pre-definable intermediate position between the valve seats.

This aspect of the invention with the at least one positioning element may be realized as a separate invention, independently of the invention described in the preceding text. However, of course a combination of these two inventions and their embodiments is also possible.

The features according to the invention are preferably embodied in those closure devices in which the closure element is relatively large and/or heavy. In this context, it may be provided that the closure element has a diameter of at least 600 mm (millimeters) and/or a mass of at least 100 kg (kilograms). In physical terms, embodiments are also conceivable in which the diameter of the closure element or the closure disk is at least 3200 mm and the mass of this closure element is at least 1.5 t or 2 t. Such closure devices may be used in railway tunnels, for example, so that a negative pressure environment can be created on track segments between two closure devices. Other forms of application for such large closure devices are for example processing chambers, in which very large objects such as for example satellites and the like are to be worked on and/or built and/or tested under conditions of negative pressure.

Preferred embodiments of closure devices according to the invention further provide that a guide or the guide along which the closure element is movable between the open state and the intermediate state is a linear guide. It may also be provided that the guide, or one or more guiderails of the guide along which the closure element is movable between the open state and the intermediate state includes or include at least one exposure area for the closed state, in which an element of the closure element which is guided by the guide or guiderail is exposed to enable the closure element to be pressed against the valve seat or one of the valve seats. The guided element of the closure element may also interact in this exposure area with the abovementioned positioning element, for example.

In general, it should be noted that unless specifically indicated otherwise, indicators of number such as for example one are to be understood to mean at least one, that is to say one or more. The same applies for number indicators such as two and the like. Thus, a plurality of the components mentioned may also be present in each case, even if they are only mentioned in the singular.

BRIEF DESCRIPTION OF THE DRAWINGS

Further features and details of preferred embodiments will be explained by way of example in the following text with reference to exemplary embodiments thereof. In the drawings.

DETAILED DESCRIPTION

Figure 1:
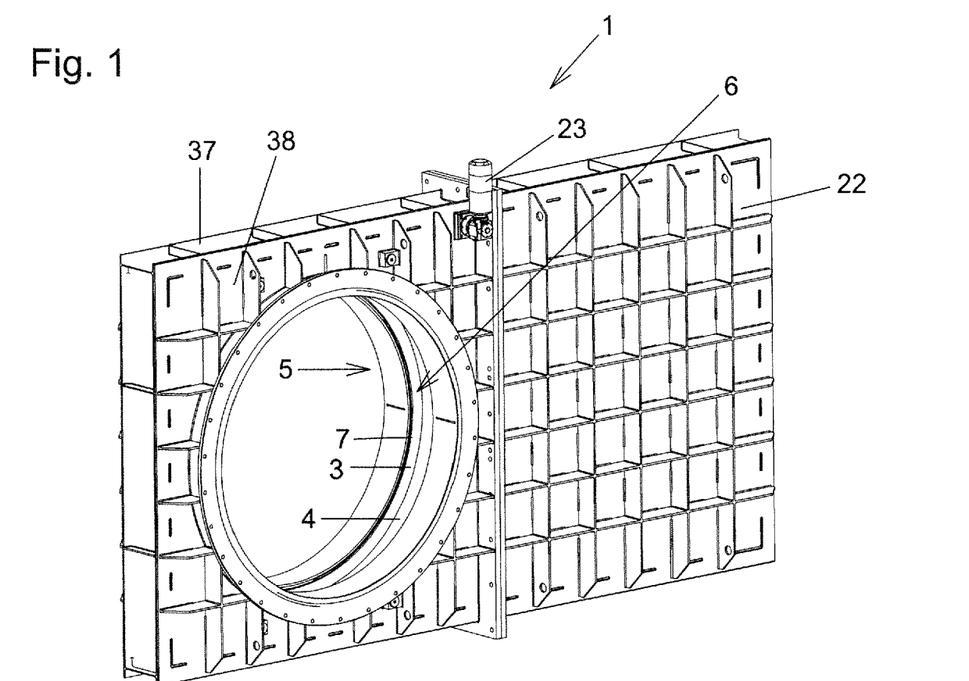
FIGS. 1 to 21 are representations of a first exemplary embodiment of the invention.
Figure 2:
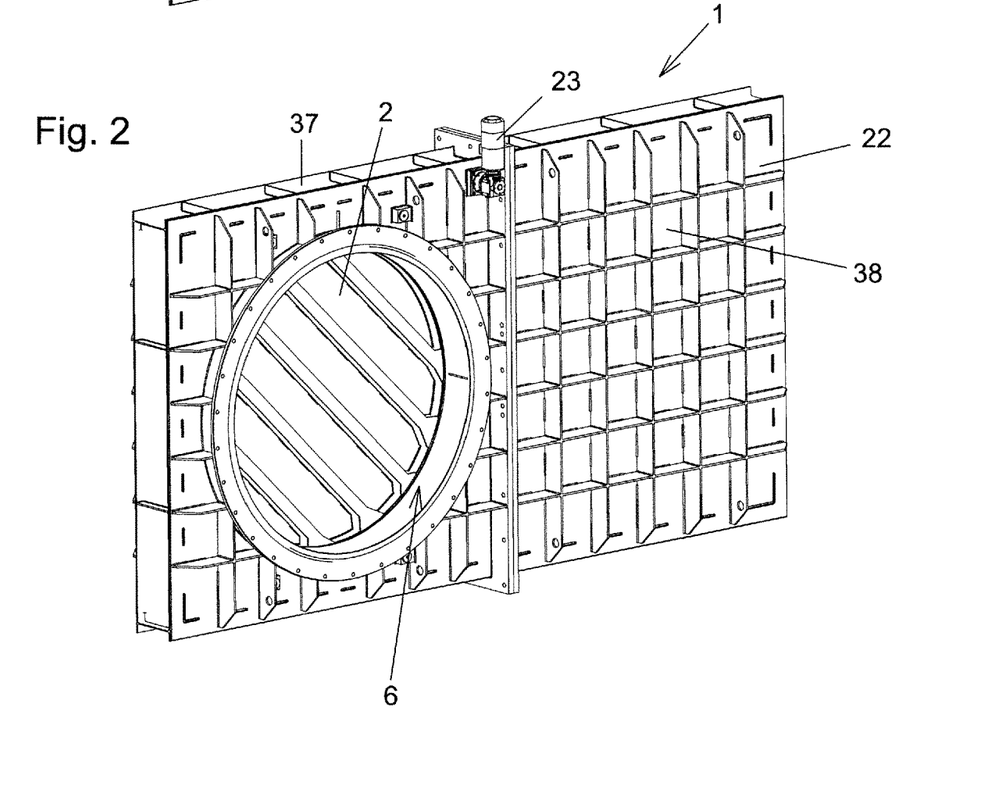

FIGS. 1 and 2 show the closure device 1 according to the invention in a perspective view. It comprises a housing 22 in which the closure element 2 is displaceably mounted. The displacement movement of the closure element 2 between its open state as shown in FIG. 1 and its intermediate state as shown in FIG. 2 is effected by a motor 23. In this exemplary embodiment, the openings 5 and 6 which are closable by the closure element 2 are completely exposed in the open state. In the intermediate state, although the closure element 2 already completely covers both openings 5 and 6, the closure element 2 is not yet in contact with the valve seats 3 and 4 which surround the openings 5 and 6. In the closed state, at least one, and preferably both of the openings 5 and 6 are sealed by the seals 7 and 8. In the embodiment shown, the housing 22 comprises a first wall 37 and a second wall 38. In the open state the closure element 2 is hidden in a hollow space between these two walls 37 and 38. In this exemplary embodiment the valve seats 3 and 4 are integrated in the housing 22. The valve seat 3 is connected fixedly to the first wall 37. The valve seat 4 is connected fixedly to the second wall 38.

In the exemplary embodiment shown, the two openings 5 and 6 and the valve seats 3 and 4 that surround them are arranged in alignment with each other.

Figure 3:
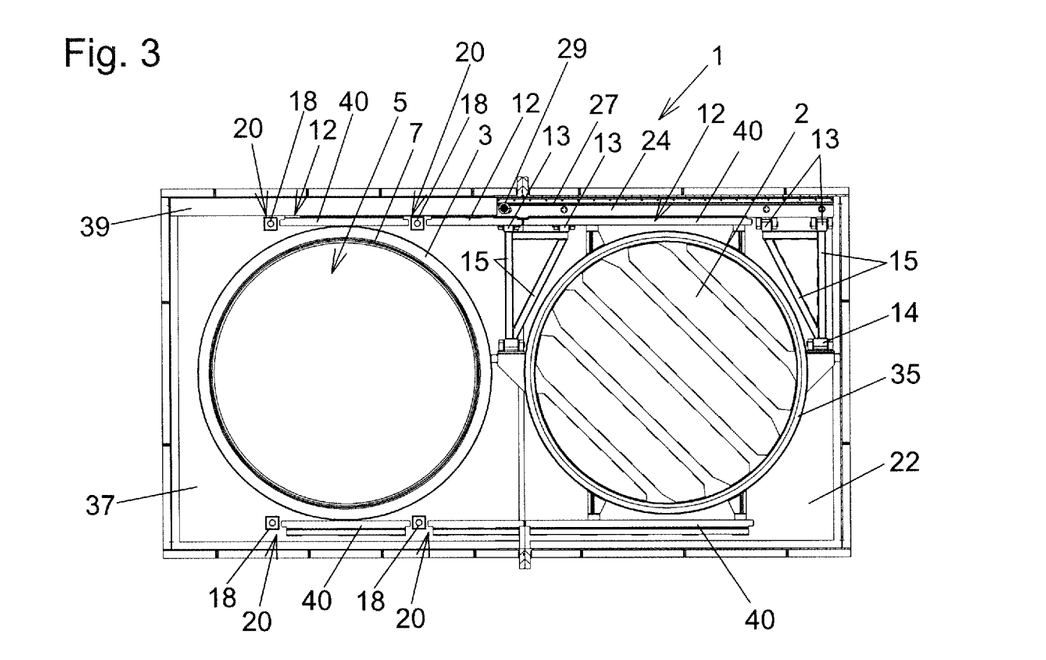
Figure 4:
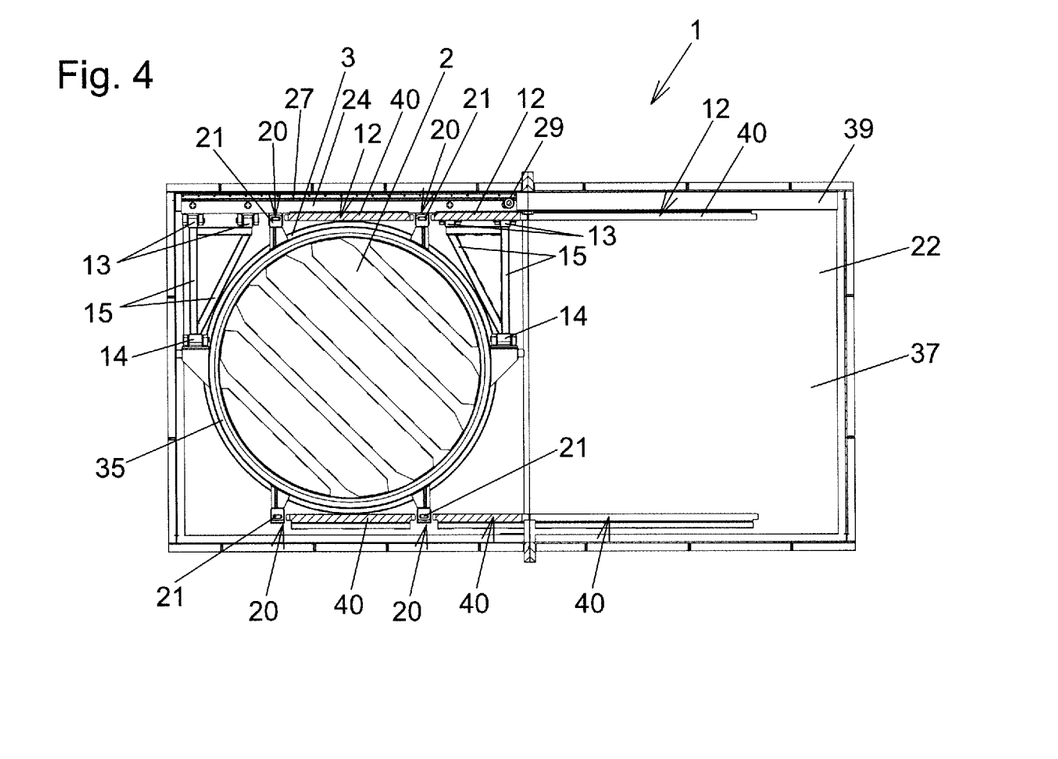

FIGS. 3 and 4 now provide a view inside the housing 22 which would be visible if the second wall 38 and the valve seat 4 were removed. FIG. 3 again shows the open state, in which the closure element 2 completely exposes the opening 5 and thus also the opening 6 aligned therewith, which is not shown here. FIG. 4 shows the position of the closure element in the intermediate state and in the closed state. In this position as shown in FIG. 4, the closure element 2 completely covers the openings 5 and 6. In other words, the closure element 2 is thus brought into alignment with the openings 5 and 6.

Figure 5:
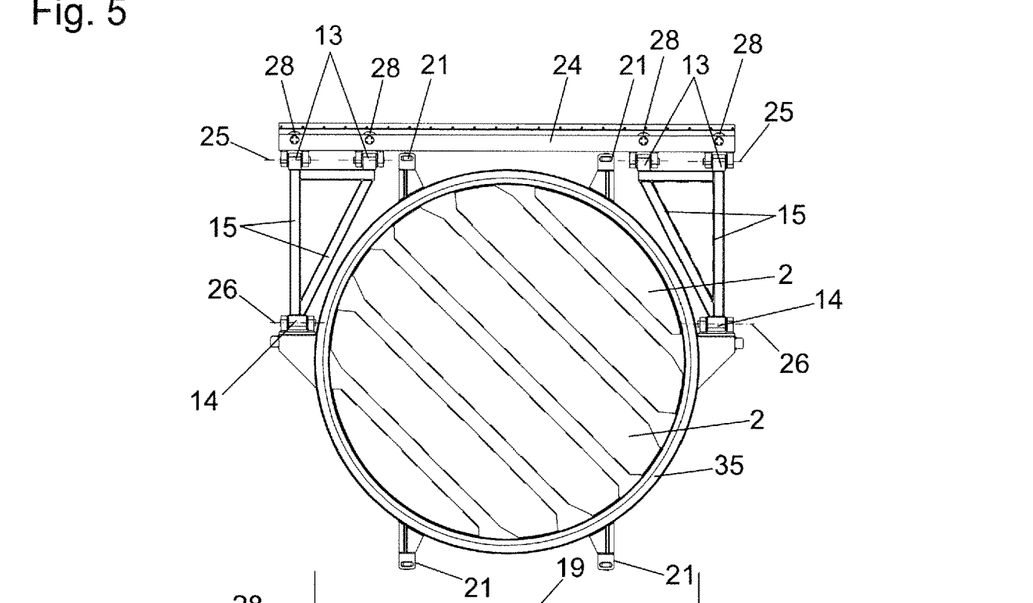
Figure 6:
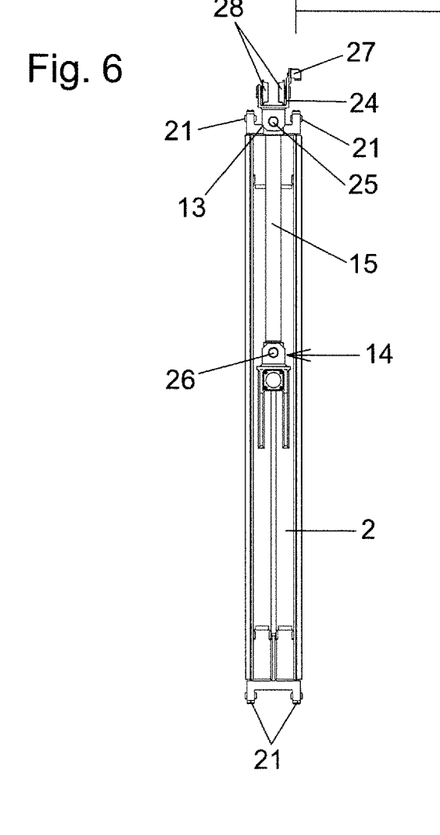
Figure 7:
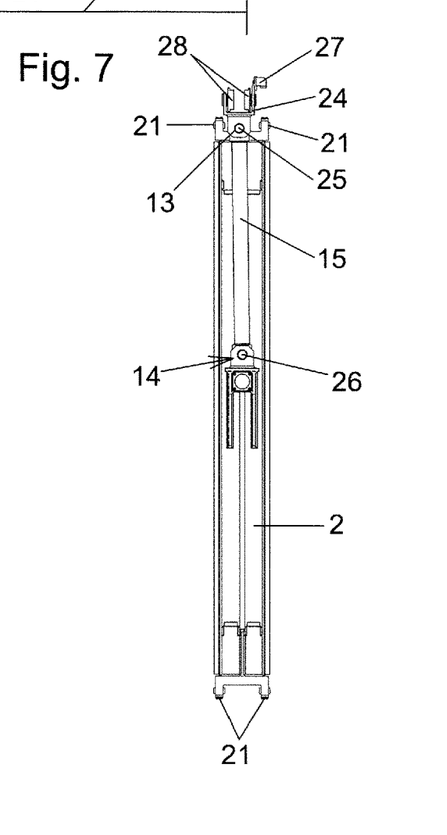

FIGS. 5, 6, and 7 show the closure element 2 with its carriage 24, detached from the other components of the closure device 1. FIG. 5 shows a front view of the closure element 2, FIGS. 6 and 7 show side views.

In the exemplary embodiment shown here, the carriage 24 is mounted in the guide 12, or in the suspension bracket 39 thereof—here in the form of an I-beam—so as to be linearly displaceable together with closure element 2. In order to be able to be displaced along the suspension bracket 39 of the guide 12, the carriage has rollers 28 which are guided in the suspension bracket 39. In order to create the linear movement of the carriage 24 together with closure element 2 between the positions as shown in FIGS. 3 and 4, in the exemplary embodiment shown here the motor 23 is provided, which engages via a gearwheel 29 in a toothed rod 27 which is fastened permanently to the carriage 24. When the motor 23 turns the gearwheel 29, this causes the carriage together with closure element 2 to move back and forth between the positions shown in FIGS. 3 and 4. The guide 12 along which the closure element 2 is movable between the open state and the intermediate state is thus a linear guide in this exemplary embodiment. However, of course the drive unit for this linear movement might also be realized in a different form. For example, it would be possible to move the carriage 24 together with closure element 2 between the positions as shown in FIGS. 3 and 4 by electric, hydraulic or pneumatic linear drives.

In the exemplary embodiment shown, the closure element 2 is disposed in the manner of a pendulum or suspended from the guide 12 and the carriage 24. In physical terms, the closure element 2 is suspended on the guide 12 so as to be adjustable in a parallel direction in the closed state or between the intermediate state and the closed state. For this purpose, in this exemplary embodiment the hinged joints 13 and 14 are provided and are connected to each other in each case via the pivot levers 15. The hinged joints 13 and 14 are pivotable about their respective pivot axes 25 and 26. The axes 25 and 26 are parallel to each other and are set apart from each other by the longitudinal extension of the pivot levers 15. As may be seen particularly clearly in FIGS. 3 to 7, the hinged joint 14 arranged in each case on the closure element 2 is advantageously positioned approximately in the middle region, preferably in the middle third of the closure element 2, so that the closure element 2 is pivotable in the manner of a pendulum about the hinged joint axes 26. Additionally, the closure element 2 is pivotable together with the pivot levers 15 in the manner of a pendulum about the pivot axes 25 of the hinged joints 13. This enables a parallel adjustment of the closure element 2, so that it can be pressed flush against one of the valve seats 3 or 4 and the seals 7 and 8 thereof, as will be explained in greater detail later with reference to FIGS. 12 to 18. At any rate, FIG. 6 shows the position in which the closure element 2 is in its starting or intermediate position. FIG. 7 shows a situation in which the closure element has been shifted in a parallel direction towards one of the valve seats compared with the situation shown in FIG. 6. This is readily discernible from the slightly deflected position of the pivot lever 15 compared with FIG. 6. The valve seat 3 and 4 is not represented in FIG. 7.

Besides the suspension bracket 39, the guide 12 also has guiderails 40, in this exemplary embodiment connected permanently to the walls 37 and 38. These serve to guide the guided elements 21 which are arranged fixedly on the closure element 2. The guidance of the guided elements 21 and consequently of the closure element 2 along the guiderails 40 ensures that when the closure element 2 is shifted between the positions shown in FIGS. 3 and 4 the closure element in these operating states cannot be pivoted inadvertently, or at least not unintentionally far about the pivot axes 25 and 26. Thus, the interaction between the guided elements 21 and the guiderails 40 and consequently with the guide 12 ensures that the closure element 2 is precisely aligned when is it brought from the open state into the intermediate state or from the intermediate state into the open state.

The guide 12, and here specifically the guiderails 40, however, include exposure areas 20 for the closed state in which the guided element 21 is exposed by the guide 12 and its guiderail 40. FIG. 4 illustrates the position in which each of the guided elements 21 are in the exposure areas 20 of the guiderails 40 and the guide 12. This makes it possible for the closure element to be able to be adjusted in a parallel direction towards one of the valve seats 3 and 4 by corresponding pivoting about the pivot axes 25 and 26 in the closed state. In this exemplary embodiment, as in other advantageous exemplary embodiments of the invention as well, one positioning element 18 is located in each of these exposure areas 20, as will be explained in more detail later in this document.

As was explained in the introduction, the seals 7 and 8—which will be explained in greater detail in the following text—may be integrated in and/or affixed to both the valve seats 3 and 4 and the closure element 2. In the exemplary embodiment implemented here, the seals 7 and 8 are each integrated in one of the valve seats 3 and 4 and fastened thereto. However, as mentioned previously, the seals 7 and 8 might equally well also be fastened to and/or integrated in the closure element 2 and in particular its counter-seat 35. In any event, in the exemplary embodiment shown the seals 7 and 8 serve to lie flush not only with the closure element 2 and its counter-seat 35 but also with at least one of the valve seats 3 and 4 at the same time in the closed state, in order to seal preferably the closure element 2 against the respective valve seat 3 or 4.

It was also stated in the introduction that closure devices 1 according to the invention are particularly suitable when openings 5 and 6 with the largest possible opening cross section are needed. Accordingly, the diameter 19 of the closure element 2 of closure devices 1 according to the invention is advantageously at least 600 mm.

Figure 8:
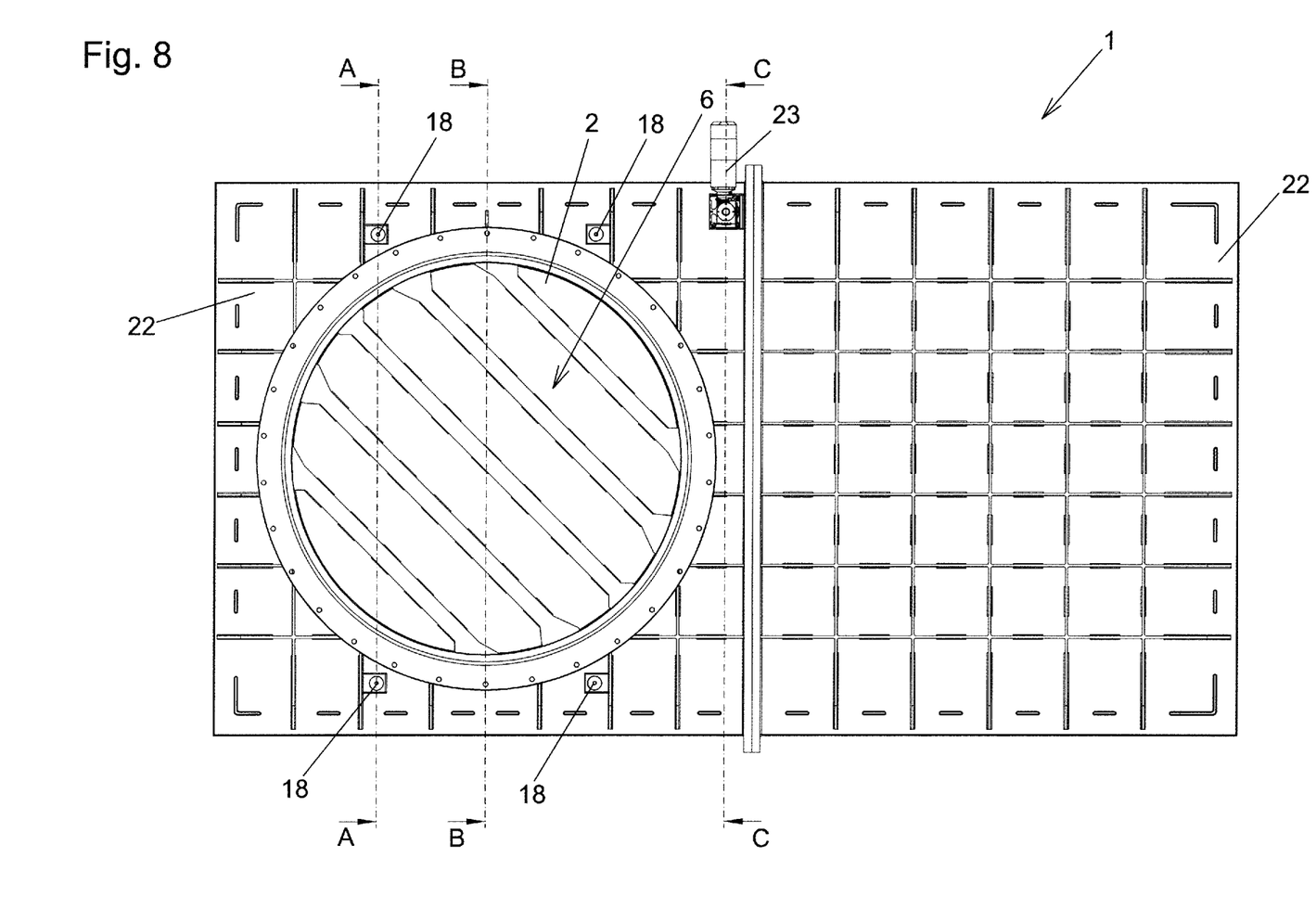
Figure 9:
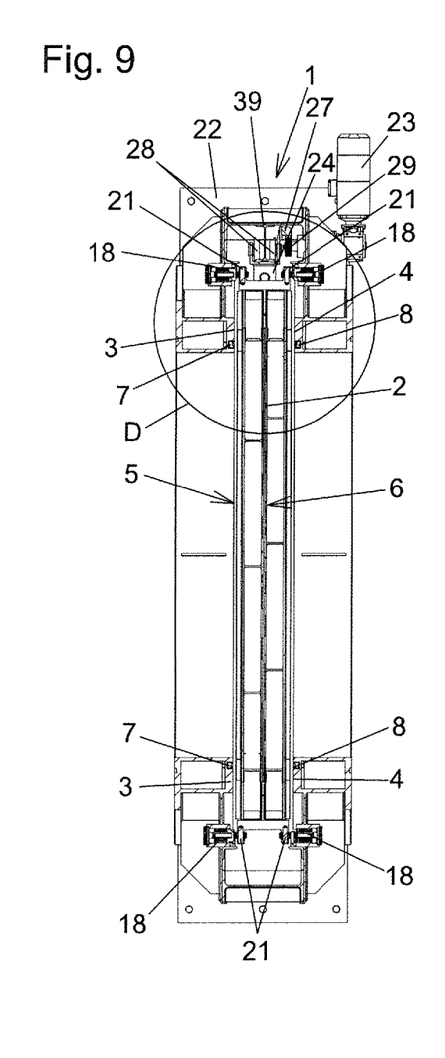
Figure 10:
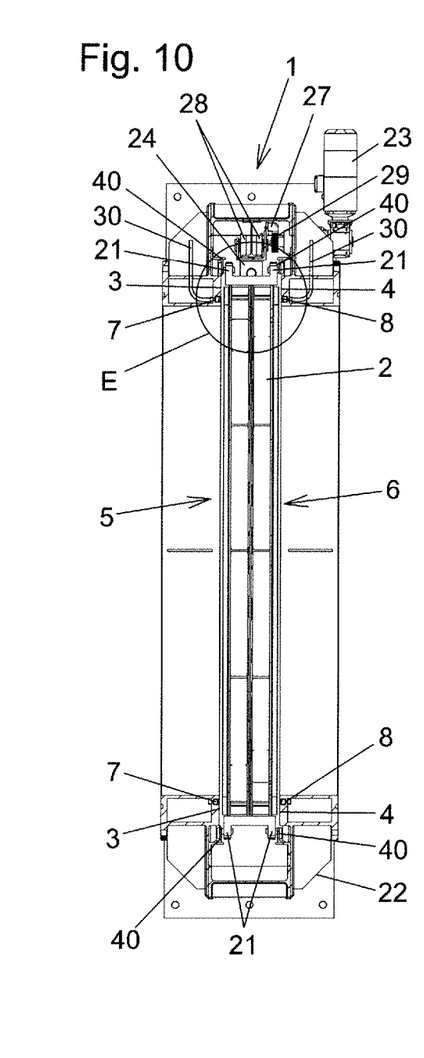
Figure 11:
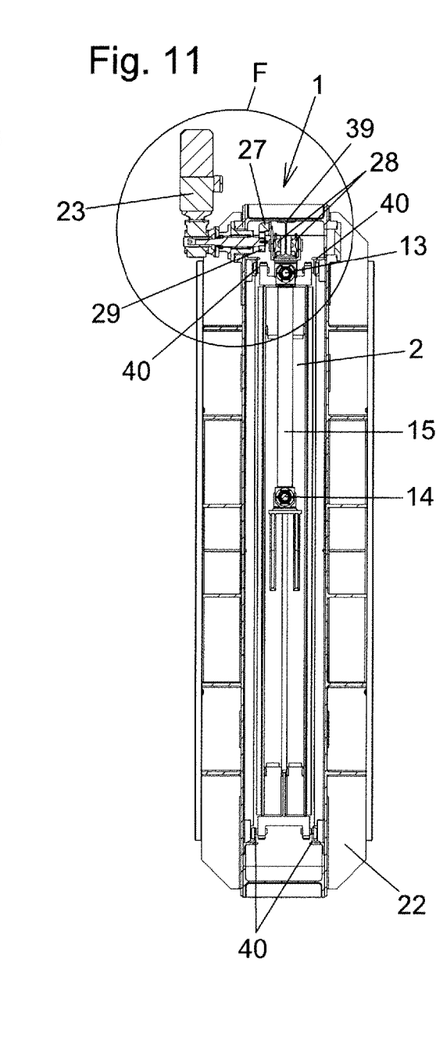
Figure 19:
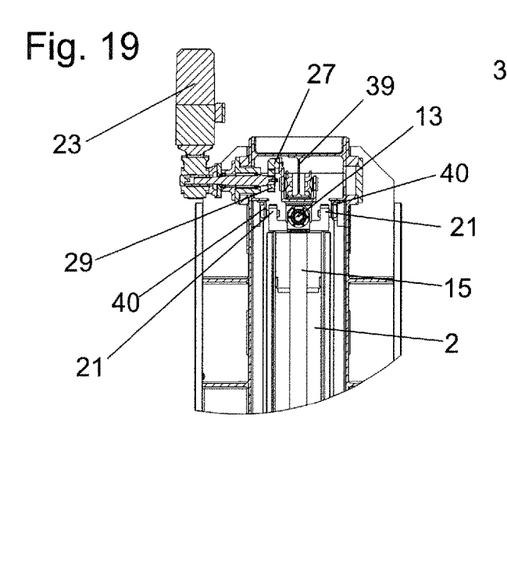

FIG. 8 shows a side view of the closure device 1 and its housing 22. The closure element 2 is in a position which when viewed from this perspective it occupies both the intermediate state and the closed state. FIG. 9 shows the vertical section along the section plane AA of FIG. 8, that is to say in the area of the positioning elements 18. FIG. 10 shows a vertical section parallel thereto along the section plane BB of FIG. 8. FIG. 11 shows a vertical section also parallel thereto along the section plane CC of FIG. 8. The area F marked in FIG. 11 is enlarged in FIG. 19. This shows the motor 23 and the gearwheel 29 that is driven by it. The gearwheel 29 engages in the toothed rod 27 which is affixed to the carriage 24. Turning the gearwheel 29 causes the carriage 24 together with closure element 2 to be shifted along the guide 12 between the open state and the intermediate state. The guide for the guided elements 21 on the guiderails 40 can also be clearly seen in FIG. 19.

Figure 12:
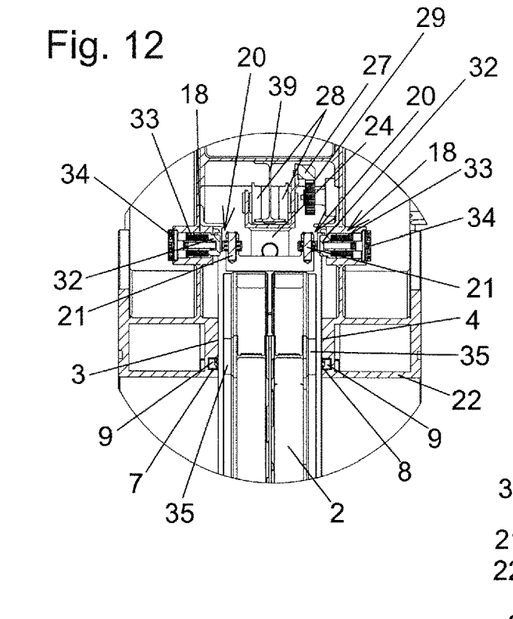
Figure 13:
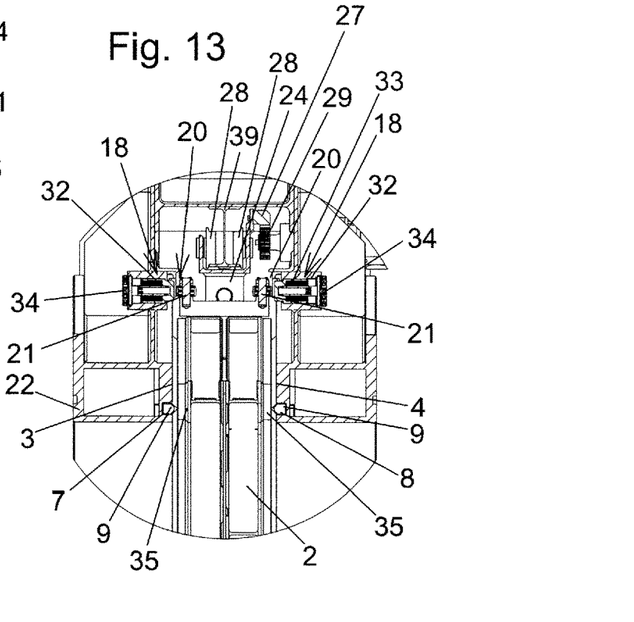
Figure 14:
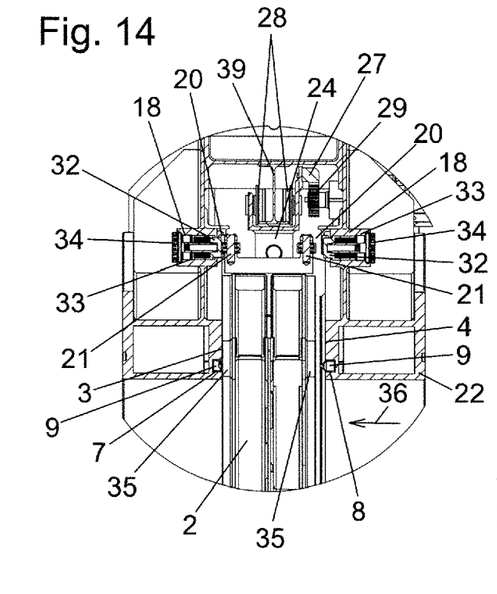

FIGS. 12, 13, 14 and 15 show enlarged views of area D from FIG. 9, wherein various states are represented. FIG. 12 shows the intermediate state, in which the seals 7 and 8 anchored in the valve seats 3 and 4 are not resting on the closure element 2 or its counter-seats 35, and the closure element 2 is therefore not arranged in contact with the valve seats 3 and 4 but so as to be aligned with the openings 5 and 6. In FIG. 12, it can be clearly seen how in this exemplary embodiment one elastic positioning element 18 is arranged on each of the two opposite sides of the closure element 2 to align the closure element 2 in a predefined or predefinable intermediate position between the valve seats 3 and 4. These positioning elements 18 are both mounted and fixed in the housing 22. They both have a pin 32, which is biased towards the closure element 2 by a bellows 33. The force of the bias and also the initial position of the pin 32 may each be adjusted by an adjusting screw 34 of the respective positioning element 18. Of course the adjusting screws 34—which in this case are actuatable manually—may also be replaced with motorized drives such as worm drives, spindle drives for the motorized adjustment of the starting position and/or the pretension at the pin 32. In this position of the closure element 2, the pins 32 act on the respective guided elements 21, which are arranged fixedly on the closure element 2. If no other force acts on it, the closure element is aligned in the intermediate position predefined by the positioning elements 18 between the valve seats 3 and 4 by the positioning elements 18. Here, as optionally in other exemplary embodiments as well, this intermediate position is advantageously selected in the middle between the valve seats 3 and 4, so that when the closure element is moved from the intermediate state represented in FIG. 12 into the open state and back it is not possible for a collision to occur between the closure element 2 and the valve seats 3 and 4 or seals 7 and 8. Instead, the positioning elements 18 hold the respective guided element 21 in the intermediate position so that it can then easily be transferred to the guiderails 40 when the closure element is slid along the guide 12. FIG. 13 shows the same section, but in a different operating state. In FIG. 13 too, the closure element 2 is still in the intermediate position between the valve seats 3 and 4. However, in FIG. 13 the application of pressure medium to the hollow spaces 9 of the seals 7 and 8 now causes the seals 7 and 8 to be pressed against the closure element 2 and its counter-seats 35. In this way, a closed state of the closure element 2 was reached in which the closure element 2 at least rests on the valve seats 3 and 4 by the seal 7 and 8. Here, in FIG. 13 the positioning elements 18 continue to hold the closure element in the intermediate position. However, this can change as soon as a differential pressure 36 acts on the closure element 2. In FIG. 14, a situation is represented in which a differential pressure 36 acts on the closure element 2 from the right, so that the closure element 2 in the closed state is adjusted in a parallel direction towards the left valve seat 3. At the same time, in the situation presented here the seal 7 is pressed inwards and the counter-seat 35 braces the closure element 2 flat against the valve seat 3. On the other side, the seal 8 in this exemplary embodiment then loses contact with the counter-seat 35 of the closure element 2 there. However, this does not alter the fact that the closure element 2 is still in the closed state, since at least one of the seals, specifically in this case the seal 7, still ensures that a corresponding seal is maintained.

The force resulting from the differential pressure 36 that acts on the closure element 2 ensures that in FIG. 14 the pin 32 of the left positioning element 18 is pushed in, compressing the bellows 33, while on the other side, that is to say the right side in FIG. 14, the guided element 21 loses contact with the pin 32 of the right positioning element 18 there.

Figure 15:
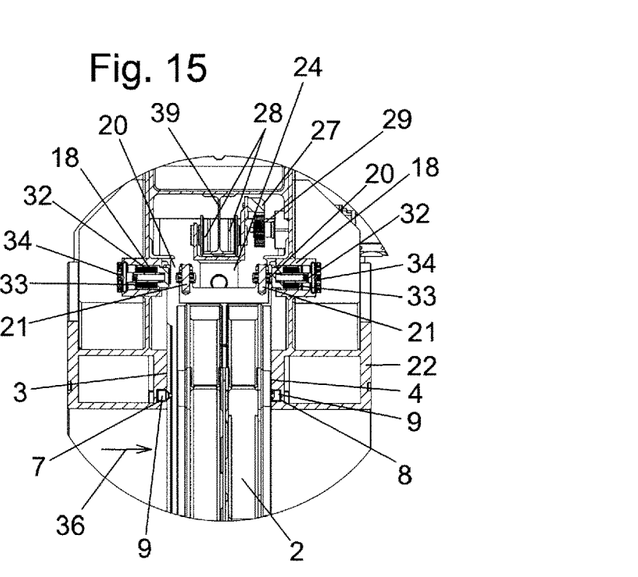

Starting from the situation of FIG. 14, as soon as sufficient differential pressure 36 has been built up, the positioning element 18 on the left side in FIG. 14 serves to return the closure element 2 to the intermediate position again according to FIG. 13, as the bellows 33 presses the pin 32 of the left positioning element outwards again. FIG. 15 shows the opposite situation, in which a differential pressure 36 from the right side acts on the closure element 2 and presses it together with its counter-seat 35 against the valve seat 4, compressing the seal 8. The description provided for FIG. 14 correspondingly applies in reverse, so no further explanation is needed for this.

Regarding FIGS. 8 and 9, it should further be noted that in this exemplary embodiment, as in other preferred embodiments as well, the closure element 2 together with its guided elements 21 is mounted between two positioning elements 18 in each case at the top and bottom in the closed state and in the intermediate state. The respective bottom positioning elements 18, which are not visible in FIGS. 12 to 15 function in the same way as the top positioning elements 18, which are shown in FIGS. 12 to 15, so further explanation for them is also unnecessary.

Figure 16:
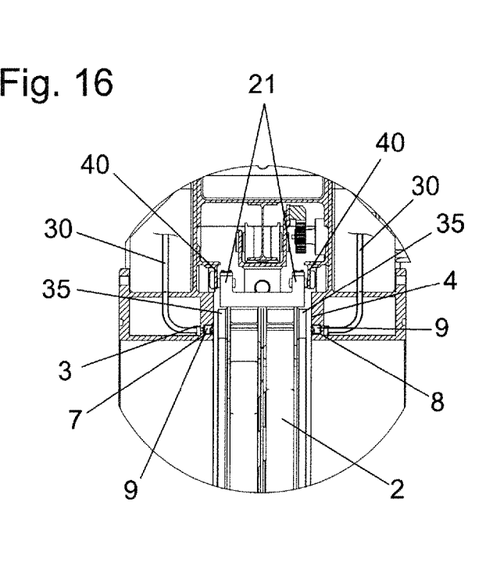
Figure 17:
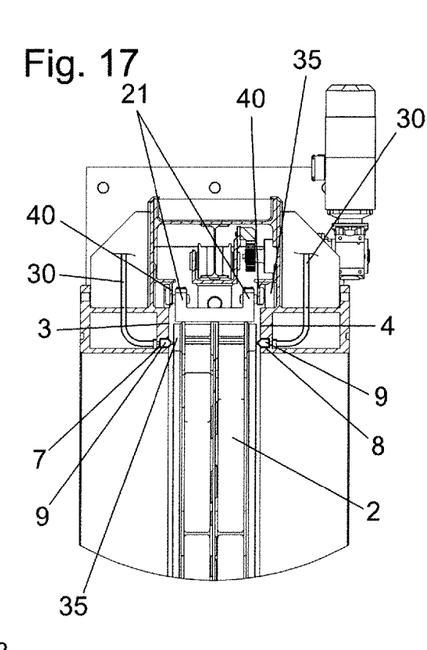
Figure 18:
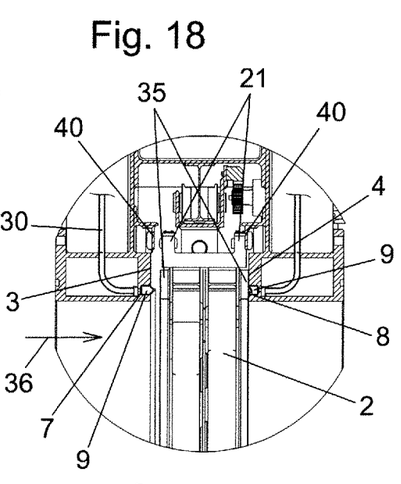

FIGS. 16, 17 and 18 show enlargements of area E from FIG. 10 in various operating states. FIG. 16 shows the intermediate state. In this state, the closure element 2 is arranged between the valve seats 3 and 4 but without contact with them. Here, it is in alignment with the openings 5 and 6. The seals 7 and 8 are each in a retracted position. Their hollow spaces 9 are not charged with pressure medium. The guiderails 40 of the guide 12, which guide the guided elements 21 and thus the closure element 2 when the guided elements 21 are not in the exposure areas 20 are also visible above the seals 7 and 8.

Starting from FIG. 16, the hollow spaces 9 in seals 7 and 8 may be charged with pressure medium from a pressure source 10 via the pressure lines 30. As a result, with the closure element 2 in the intermediate position as shown in FIG. 17 they both come into contact with the closure element 2 and its counter-seats 35, thereby creating a closed state. In FIG. 17, both seals 7 and 8 rest on the closure element 2. The closure element 2 thus rests on the valve seats 3 and 4 via the two seals 7 and 8. In this context, a correspondingly pressure-resistant seal may be created using a corresponding pressure control. Now if a pressure differential acts on the closure element 2, the closure element 2 can be pushed in the parallel direction thereby far enough that the seal is compressed on one side, on the side of seal 8 in FIG. 18, so that the counter-seat 35 of the closure element 2 present there comes to bear on the seat 4 and is then supported thereby. All the time, the sealing effect is assured here by the seal 8. The seal on the other side, in this case the seal 7, may then remain in contact with the closure element 2 and its counter-seat 35 or, as shown in FIG. 18, it may be lifted off the counter-seat 35 and thus also from the closure element 2. The reverse effect correspondingly applies for a pressure differential 36 in the opposite direction.

Figure 20:
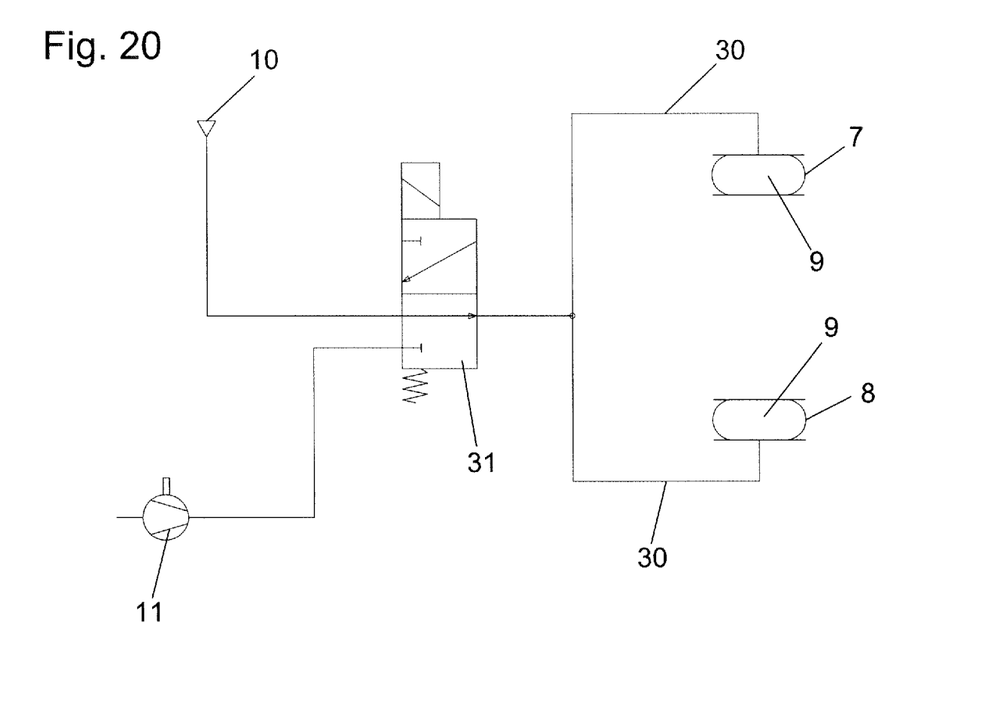
Figure 21:
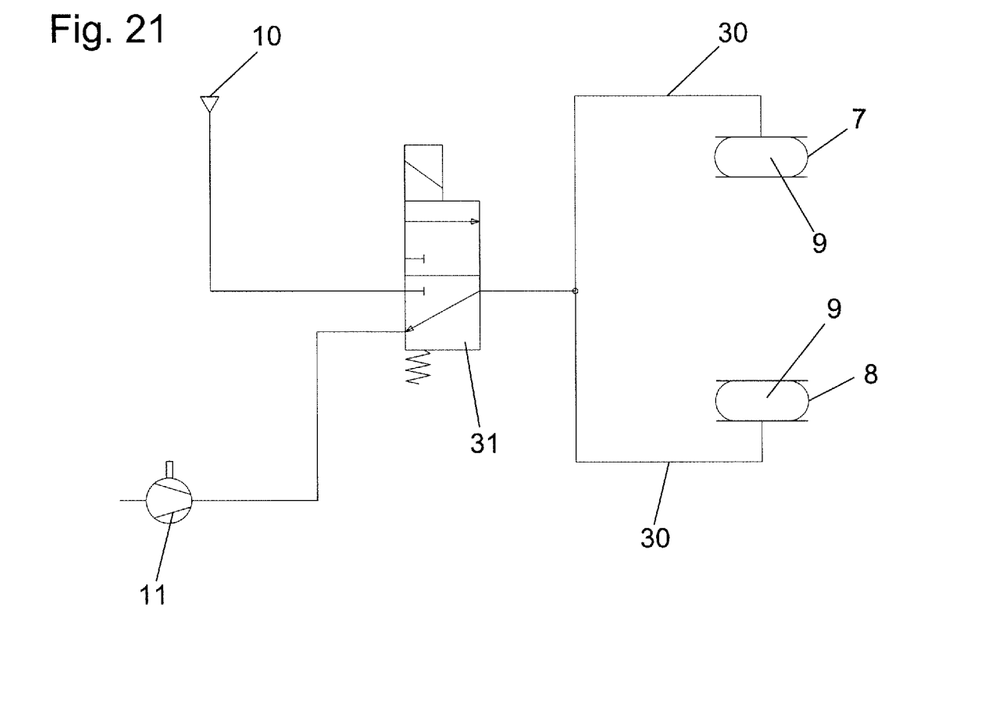

FIGS. 20 and 21 are now schematic representations of a circuit diagram which may be adapted for use with a pneumatic or hydraulic system. With this exemplary circuit shown, the hollow spaces 9 of the seals 7 and 8 may be charged with pressure medium. Moreover, according to the invention the pressure medium may also be sucked out of the hollow spaces 9 again. For this purpose, in this exemplary embodiment according to FIGS. 20 and 21 both the pressure source 10 and the suction apparatus 11 according to the invention—represented in the form of a pump here for exemplary purposes—may be connected to the hollow spaces 9 of the seals 7 and 8 via the switching valve 31 and pressure lines 30. When the switching valve 31 is in the position shown in FIG. 20, the hollow spaces 9 of both seals 7 and 8 are charged with pressure medium from the pressure source 10. When the switching valve 31 is in the switching position shown in FIG. 21, the hollow spaces 9 are connected to the suction apparatus 11 in the form of a pump via the pressure lines 30. With this suction apparatus 11 according to the invention, the pressure medium may be actively sucked out of the hollow spaces 9 in the seals 7 and 8, so that they are brought completely into their retracted position as shown in FIGS. 12 and 16 and seals 7 and 8 cannot be damaged when the closure element 2 is moved between the open state and the intermediate state.

In the exemplary embodiment as shown in FIGS. 1 to 21 which has been discussed up to now, a seal 7 and 8 is present on each side of the closure element 2. However, for the sake of completeness, it should again be noted here that exemplary embodiments of the invention in which only one of the two seals 7 and 8 is present are also conceivable. As has already been noted in the introduction, the seals 7 and 8 may be arranged in a fixed manner to the closure element 2 or, as embodied in this exemplary embodiment, arranged in a fixed manner to the respective valve seat 3 or 4.

Figure 23:
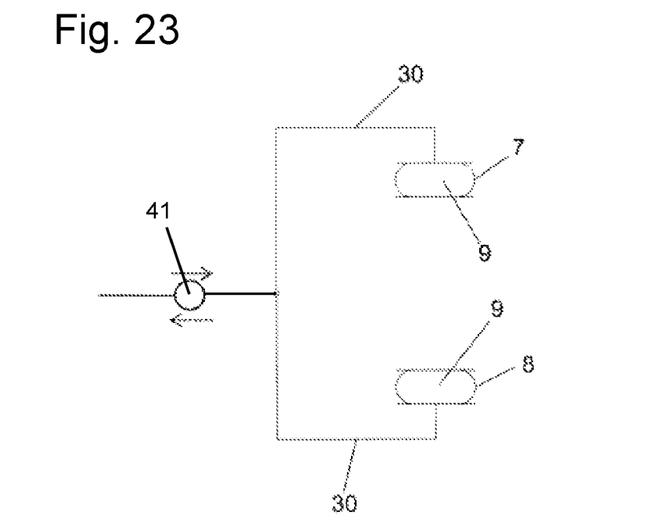
FIG. 23 is a view similar to FIG. 21 but with the pressure source and suction apparatus integrated into a combination pump.

Unlike the exemplary embodiment of FIGS. 20 and 21, of course pressure source 10 and suction apparatus 11 might also be integrated with each other, and configured as a combination pump 41, for example, as shown in FIG. 23. It might then even be possible to dispense with a switching valve 31. Alternatively, however, a switching valve might be provided in such embodiments to close the pressure line 30 when the pump is not needed. Of course, in a further embodiment the pressure source 10 according to FIGS. 20 and 21 might also have the form of a separate pump. Moreover, this suction apparatus 11 might fundamentally also be designed as a different apparatus, particularly a motorized apparatus, suitable for removing the medium by suction.

Figure 22:
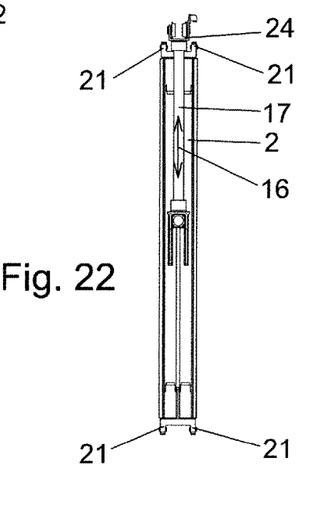
FIG. 22 is a representation of a variant akin to that of FIG. 6 but modified in this area in relation thereto.

FIG. 22 shows yet another alternative design of the suspension bracket of the closure element 2. In the variant of FIG. 22, the pivot lever 15 and the hinged joints 13 and 14 are replaced with a bending spring 17, which may be deflected transversely to its longitudinal extension 16 so that it can dispose the closure element in the manner of a pendulum and displace it in a parallel direction in the closed state. FIG. 22 also shows the closure element 2 fastened roughly to the middle of this suspension bracket. The closure element 2 is preferably suspended from the pivot lever 14 or the bending spring 17 or combinations thereof in the middle third of the closure element 2.

KEY TO THE REFERENCE NUMBERS

| | |
|---|---|
| 1 | Closure device |
| 2 | Closure element |
| 3 | Valve seat |
| 4 | Valve seat |
| 5 | Opening |
| 6 | Opening |
| 7 | Seal |
| 8 | Seal |
| 9 | Hollow space |
| 10 | Pressure source |
| 11 | Suction apparatus |
| 12 | Guide |
| 13 | Hinged joint |
| 14 | Hinged joint |
| 15 | Pivot lever |
| 16 | Longitudinal extension |
| 17 | Bending spring |
| 18 | Positioning element |
| 19 | Diameter |
| 20 | Exposure area |
| 21 | Guided element |
| 22 | Housing |
| 23 | Motor |
| 24 | Carriage |
| 25 | Pivot axis |
| 26 | Pivot axis |
| 27 | Toothed rod |
| 28 | Rollers |
| 29 | Gearwheel |
| 30 | Pressure line |
| 31 | Switching valve |
| 32 | Pin |
| 33 | Bellows |
| 34 | Adjusting screw |
| 35 | Counter-seat |
| 36 | Differential pressure |
| 37 | First wall |
| 38 | Second wall |
| 39 | Suspension bracket |
| 40 | Guiderail |

The invention claimed is:

1. A closure device comprising:
a valve seat that surrounds an opening;
a closure element for closing the opening that is surrounded by the valve seat;
a seal between the valve seat and the closure element, the seal including a hollow space;
wherein the closure device has an open state of the closure element, in which the closure element at least partly exposes the opening to allow an object to be passed through the opening, an intermediate state of the closure element, in which the closure element is brought into alignment with the opening without contact with the valve seat, and a closed state of the closure element, in which the closure element at least rests on the valve seat via the seal;
a pressure source for applying a pressure medium to the hollow space of the seal;
a suction source for sucking the pressure medium out of the hollow space of the seal;
a guide along which the closure element is movable between the open state and the intermediate state, the guide has at least one exposure area for the closed state, in which an element of the closure element that is guided by the guide is exposed to enable the closure element to be pressed against the valve seat; and
the closure element is arranged as a suspended pendulum.

2. The closure device as claimed in claim 1, wherein at least one of the pressure source or the suction source comprises a pump.

3. The closure device as claimed in claim 1, further comprising a second valve seat that surrounds a second opening, and the closure element in the intermediate state is arranged between the openings without contact with the valve seats, and in the closed state a second seal is arranged between the second valve seat and the closure element such that in each case one of the seals is located between each of the valve seats and the closure element, and the closure element at least rests on at least one of the valve seats via at least one of the seals, wherein the second seal has a second hollow space, and a pressure medium is appliable from the pressure source to each of the hollow spaces and the suction source can apply suction to each of the hollow spaces to remove the pressure medium.

4. The closure device as claimed in claim 1, further comprising at least two hinged joints and at least one pivot lever between the hinged joints, and the closure element is arranged on at least one pivot lever.

5. The closure device as claimed in claim 1, further comprising a pump that acts as the pressure source and the suction source.

6. The closure device as claimed in claim 1, wherein the closure element is arranged in the closed state or so as to be adjustable in a parallel direction between the intermediate state and the closed state on the guide along which the closure element is movable between the open state and the intermediate state.

7. The closure device as claimed in claim 6, further comprising at least one bending spring which is deflectable transversely to a longitudinal extension on the guide along which the closure element is movable between the open state and the intermediate state.

8. A closure device comprising:
   first and second valve seats surrounding respective first and second openings;
   a closure element for closing the two openings wherein the closure device has an open state of the closure element, in which the closure element at least partly exposes the openings to allow an object to be passed through the openings, an intermediate state of the closure element, in which the closure element is arranged between the openings without contact with the valve seats, and a closed state of the closure element, in which the closure element at least rests on at least one of the valve seats via at least one seal;
   at least one positioning element that is configured to align the closure element in a predefined or pre-definable intermediate position between the valve seats;
   a guide along which the closure element is movable between the open state and the intermediate state, the guide has at least one exposure area for the closed state, in which an element of the closure element that is guided by the guide is exposed to enable the closure element to be pressed against the valve seat; and
   the closure element is arranged as a suspended pendulum.

9. The closure device as claimed in claim 8, wherein the at least one positioning element is elastic and at least one of the elastic positioning elements is located on each of two opposite sides of the closure element for aligning the closure element in the predefined or pre-definable intermediate position between the valve seats.

10. The closure device as claimed in claim 8, further comprising:
    the at least one seal includes first and second seals located respectively between the first and second valve seats and the closure element, the first and second seals including a hollow space;
    a pressure source that is connectable to each of the hollow spaces for applying a pressure medium; and
    a suction source that is connectable to each of the hollow spaces for applying suction to remove the pressure medium.

11. The closure device as claimed in claim 10, wherein the closure element has a diameter of at least 600 mm.

12. The closure device as claimed in claim 10, wherein the guide comprises a linear guide along which the closure element is movable between the open state and the intermediate state.

13. The closure device as claimed in claim 10, wherein the guide has at least one guiderail for guiding the element that is guided, the guiderail includes the exposure area in which the element of the closure element guided by the guiderail is exposed to enable the closure element to be pressed against at least one of the valve seats.

14. The closure device as claimed in claim 13, wherein the guide comprises a plurality of guiderails, which are connected fixedly to walls of a housing of the closure device.

15. The closure device as claimed in claim 10, wherein the closure element has a mass of at least 100 kg.

* * * * *

UNITED STATES PATENT AND TRADEMARK OFFICE
CERTIFICATE OF CORRECTION

PATENT NO. : 10,890,262 B2
APPLICATION NO. : 16/092088
DATED : January 12, 2021
INVENTOR(S) : Neumeir et al.

Page 1 of 1

It is certified that error appears in the above-identified patent and that said Letters Patent is hereby corrected as shown below:

In the Claims

In Claim 6, at Column 13, Line 9, after the word "arranged", delete "in the closed state or so as".

Signed and Sealed this
Twenty-third Day of March, 2021

Drew Hirshfeld
*Performing the Functions and Duties of the*
*Under Secretary of Commerce for Intellectual Property and*
*Director of the United States Patent and Trademark Office*